United States Patent
Kubozono

(10) Patent No.: US 11,460,324 B2
(45) Date of Patent: Oct. 4, 2022

(54) SCALE AND ENCODER

(71) Applicant: MITUTOYO CORPORATION, Kanagawa (JP)

(72) Inventor: Hiroto Kubozono, Kanagawa (JP)

(73) Assignee: MITUTOYO CORPORATION, Kawasaki (JP)

(*) Notice: Subject to any disclaimer, the term of this patent is extended or adjusted under 35 U.S.C. 154(b) by 0 days.

(21) Appl. No.: 16/953,022

(22) Filed: Nov. 19, 2020

(65) Prior Publication Data

US 2021/0180991 A1    Jun. 17, 2021

(30) Foreign Application Priority Data

Dec. 17, 2019   (JP) .............................. JP2019-227425

(51) Int. Cl.
    *G01D 5/20*    (2006.01)
(52) U.S. Cl.
    CPC ...................... *G01D 5/20* (2013.01)
(58) Field of Classification Search
    CPC ............. G01D 5/20; G01D 5/204; G01D 5/12
    See application file for complete search history.

(56) References Cited

U.S. PATENT DOCUMENTS

| | | | | |
|---|---|---|---|---|
| 5,815,091 | A * | 9/1998 | Dames | G01D 5/206 340/870.34 |
| 6,124,708 | A * | 9/2000 | Dames | G01D 5/2053 324/207.12 |
| 6,249,234 | B1 * | 6/2001 | Ely | G01D 5/208 341/20 |
| 6,522,128 | B1 * | 2/2003 | Ely | G01B 7/30 324/207.17 |
| 8,421,446 | B2 * | 4/2013 | Straubinger | G01D 5/2225 324/207.15 |
| 10,564,009 | B2 * | 2/2020 | Hubrich | G01D 5/2073 |
| 2012/0223724 | A1 * | 9/2012 | Vasiloiu | G01B 7/003 324/654 |
| 2015/0219475 | A1 * | 8/2015 | Tsuji | G01D 5/24438 33/708 |
| 2016/0169717 | A1 * | 6/2016 | Zhitomirsky | G01D 5/20 702/94 |

FOREIGN PATENT DOCUMENTS

| | | |
|---|---|---|
| JP | 2009-168701 | 7/2009 |
| JP | 5224830 | 7/2013 |
| JP | 2019-117322 | 7/2019 |

* cited by examiner

*Primary Examiner* — Akm Zakaria
(74) *Attorney, Agent, or Firm* — Rankin, Hill & Clark LLP

(57) ABSTRACT

A scale includes a plurality of conductors that are arrayed in a given interval along a measurement axis, wherein each of the plurality of conductors has projection portions, each of which projects toward each side of the measurement axis, and wherein at least a part of each of the projection portions has a curve projecting in the measurement axis.

9 Claims, 6 Drawing Sheets

FIG. 1B

SCALE AND ENCODER

CROSS-REFERENCE TO RELATED APPLICATION

This application is based upon and claims the benefit of priority of the prior Japanese Patent Application No. 2019-227425, filed on Dec. 17, 2019, the entire contents of which are incorporated herein by reference.

FIELD

A certain aspect of embodiments described herein relates to a scale and an encoder.

BACKGROUND

There is known electromagnetic induction type encoders using electromagnetic connection between a detection head and a scale (for example, see Japanese Patent Application Publication No. 2009-168701).

SUMMARY

An unintended high frequency signal (higher harmonics wave) included in a sensor signal of the electromagnetic induction type encoder may cause degradation of measurement accuracy of the electromagnetic induction type encoder. Therefore, suppression of occurrence of the higher harmonics wave is requested. And so, it is thought that a receiver coil has a sine wave shape for the purpose of suppressing the occurrence of the higher harmonics wave. However, the receiver coil usually has a wiring pattern having two or more layers in a printed substrate. Therefore, there are many restrictions in designing of the receiver coil. It may be difficult to change the shape of the receiver coil, in a small size encoder having a micro sensor pattern.

In one aspect of the present invention, it is an object to provide a scale and an encoder that are capable of suppressing higher harmonics wave.

According to an aspect of the present invention, there is provided a scale including: a plurality of conductors that are arrayed in a given interval along a measurement axis, wherein each of the plurality of conductors has projection portions, each of which projects toward each side of the measurement axis, wherein at least a part of each of the projection portions has a curve projecting in the measurement axis.

According to another aspect of the present invention, there is provided an electromagnetic induction type encoder including: the above-mentioned scale; and a detection head that relatively moves in the measurement axis with respect to the scale, wherein the detection head has a transceiver coil configured to generate magnetic flux, wherein the plurality of conductors of the scale are configured to be electromagnetically coupled with the magnetic flux generated by the transceiver coil and generate magnetic flux that fluctuates in a predetermined spatial period in the measurement axis direction, wherein the detection head has a receiver coil is configured to be electromagnetically coupled with the magnetic flux generated by the plurality of conductors and detect a phase of the magnetic flux.

DESCRIPTION OF EMBODIMENTS

The following is a description of embodiments, with reference to the accompanying drawings.

Figure 1A:
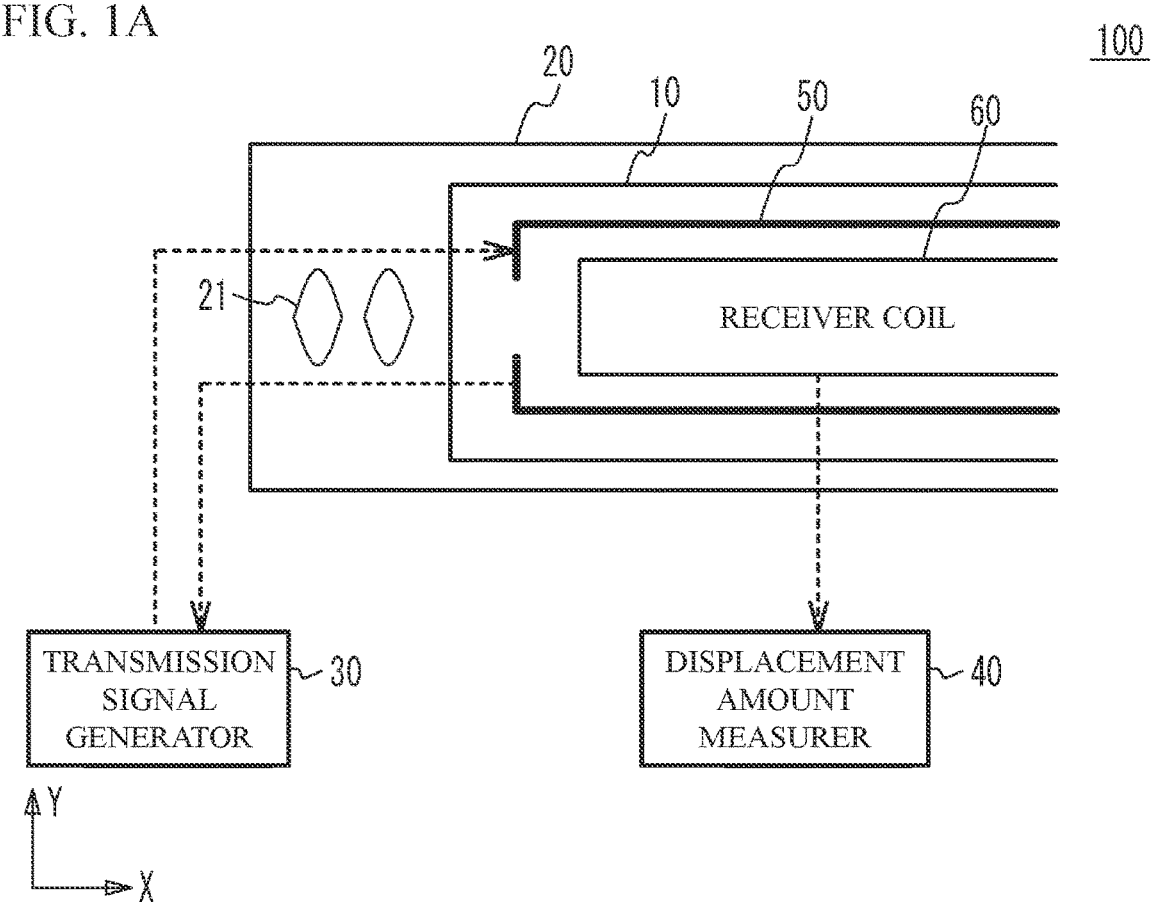
FIG. 1A illustrates a structure of an electromagnetic induction type encoder.

FIG. 1A illustrates a structure of an electromagnetic induction type encoder 100 using electromagnetic connection between a detection head and a scale. As illustrated in FIG. 1A, the electromagnetic induction type encoder 100 has a detection head 10 and a scale 20. The detection head 10 relatively moves in a measurement axis direction with respect to the scale 20. The detection head 10 and the scale 20 have a flat plate shape and face with each other through a predetermined gap. The electromagnetic induction type encoder 100 has a transmission signal generator 30 and a displacement amount measurer 40 and so on. In FIG. 1A, X-axis indicates a displacement direction of the detection head 10 (measurement axis). Y-axis is vertical to the X-axis in a plane formed by the scale 20.

The detection head 10 has a transceiver coil 50, a receiver coil 60 and so on. The transceiver coil 50 is a rectangular coil of which a longitudinal direction is the X-axis. As illustrated in FIG. 1A, the receiver coil 60 is inside of the transceiver coil 50. The shape of the receiver coil 60 is described later.

In the scale 20, a plurality of connection conductors 21 are arrayed in the fundamental period λ along the X-axis. The fundamental period is an interval between centers of the two connection conductors 21 next to each other, in the X-axis direction. Each of the connection conductors 21 is a closed loop coil or a board shape conductor without a hole. Each of the connection conductors 21 is electromagnetically coupled with the transceiver coil 50 and is also electromagnetically coupled with the receiver coil 60.

Figure 1B:
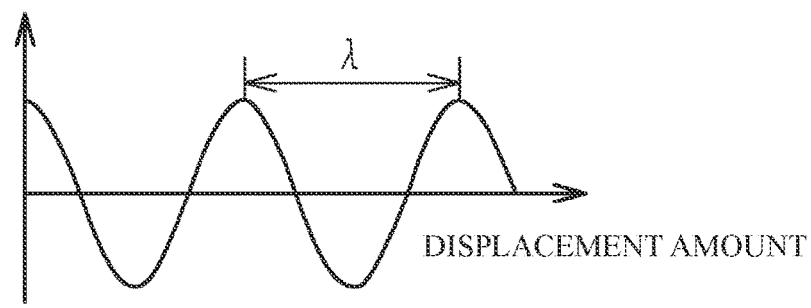
FIG. 1B illustrates a signal which is output by a receiver coil.

The transmission signal generator 30 generates a transmission signal of a single phase AC and supplies the generated transmission signal to the transceiver coil 50. In this case, magnetic flux is generated in the transceiver coil 50. Thus, an electromotive current is generated in the plurality of connection conductors 21. The plurality of connection conductors 21 are electromagnetically coupled with the magnetic flux generated by the transceiver coil 50 and generate magnetic flux fluctuating in the X-axis direction in a predetermined spatial period. The magnetic flux generated by the connection conductors 21 generates an electromotive current in the receiver coil 60. The electromagnetic coupling among each coil fluctuates in accordance with the displacement amount of the detection head 10. Thereby, a sine wave signal of the same period as the fundamental period λ is obtained. Therefore, the receiver coil 60 detects a phase of the magnetic flux generated by the plurality of connection conductors 21. The displacement amount measurer 40 can use the sine wave signal as a digital amount of a minimum resolution by electrically interpolating the sine wave signal. Thereby, the displacement amount measurer 40 measures the displacement amount of the detection head 10. In FIG. 1B, a horizontal axis indicates a displacement amount of the detection head 10. A vertical axis indicates an output voltage of the receiver coil 60.

Figure 2A:
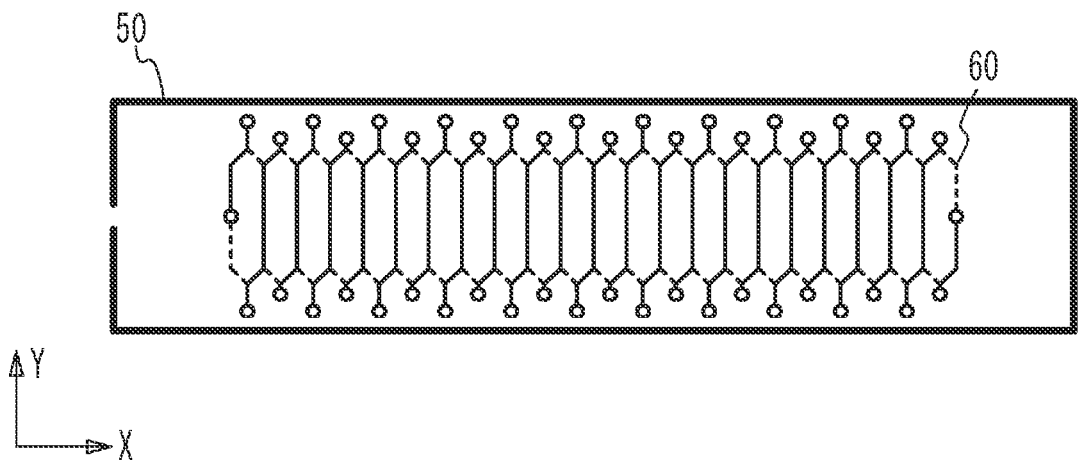
FIG. 2A illustrates a receiver coil.
Figure 2B:
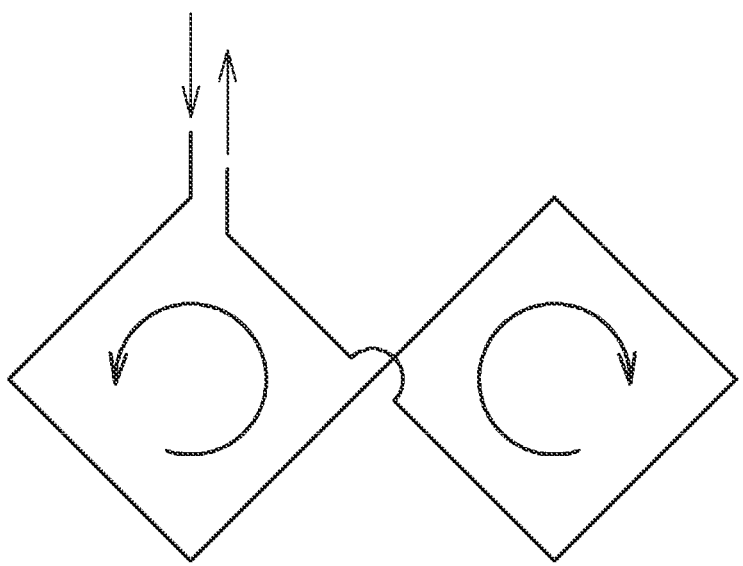
FIG. 2B illustrates a flow of a current of a receiver coil.

FIG. 2A illustrates the receiver coil 60. The receiver coil 60 is inside of the transceiver coil 50 having a rectangular coil shape. As illustrated in FIG. 2B, a flow of a current of the receiver coil 60 is a shape in which a letter "8" lies down. As illustrated in FIG. 2A, the receiver coil 60 has a shape in which two polygon coils (for example, a hexagonal shape) are adjacent to each other. That is, the receiver coil 60 has a structure in which a plurality of twist-pair structures are arrayed along the X-axis direction. In the twist-pair structure, two hexagonal coils, in which a current and another current rotated reversely are achieved, are adjacent to each other. For example, a coil in which a current rotates in a clockwise direction and another coil in which a current rotates in a counter-clockwise direction are adjacent to each other. When the receiver coil 60 has the twist-pair structure, influence of disturbance is suppressed. The polygon shape of the receiver coil 60 has two sides in parallel with the Y-axis direction.

Figure 2C:
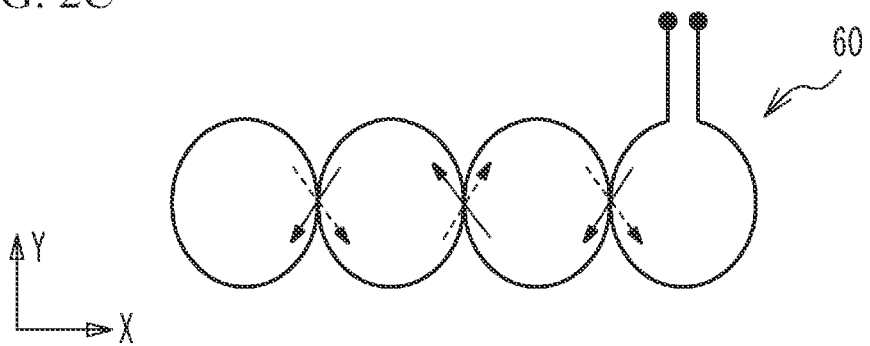
FIG. 2C illustrates a receiver coil.

The shape of the coils in the receiver coil 60 is not limited to the polygon shape. For example, as illustrated in FIG. 2C, the coils of the receiver coil 60 may have a circle shape. The receiver coil 60 may not necessarily have only one twist structure. As illustrated in FIG. 2C, the receiver coil 60 may have a structure in which a wiring extends along a sine wave in the X-axis direction, returns at an end, and extends along another sinewave in the reverse X-axis direction.

Figure 3A:
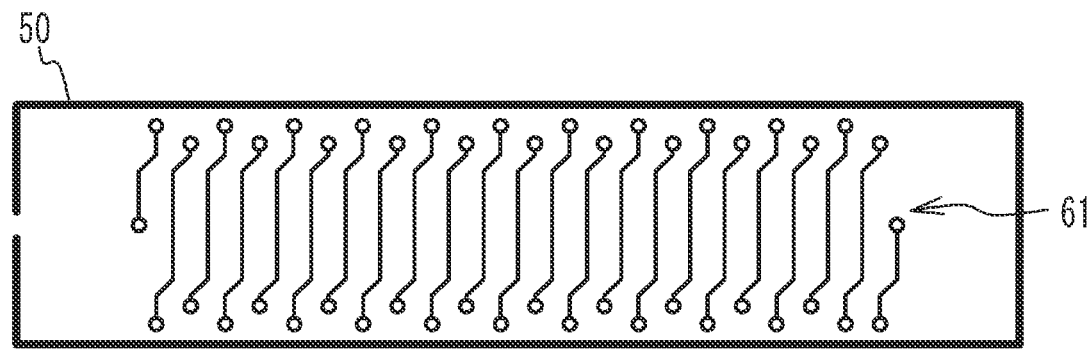
FIG. 3A illustrates a first wiring pattern formed in an upper layer of a printed substrate.
Figure 3B:
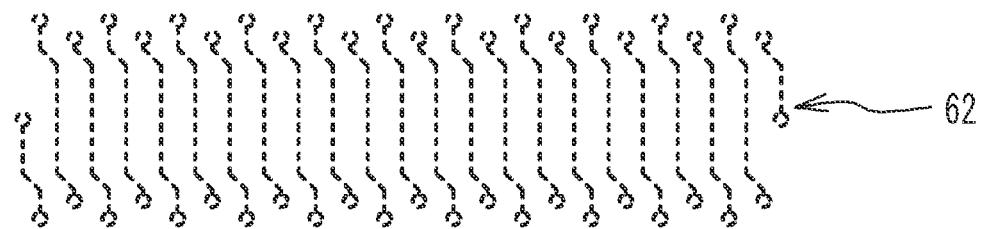
FIG. 3B illustrates a second wiring patter formed in a lower layer of a printed substrate.

In the twist-pair structure, the wiring intersects at a connection position of two coils. Therefore, the twist-pair structure has a two-layer structure. FIG. 3A illustrates a first wiring pattern 61 formed on an upper layer of a printed substrate. FIG. 3B illustrates a second wiring pattern 62 formed on a lower layer of the printed substrate. The upper layer is bonded to the lower layer. Terminals of the first wiring pattern 61 and terminals of the second wiring pattern 62 are connected via through-hole wirings or the like. Thus, the receiver coil 60 is structured.

The sine wave signal detected by the receiver coil 60 may include a signal having an unintended frequency (higher harmonics wave). The higher harmonics wave may cause degradation of the measurement accuracy of the electromagnetic induction type encoder 100. Therefore, suppression of the occurrence of the higher harmonics wave is requested. And so, it is thought that the receiver coil 60 has the sine wave shape. However, the receiver coil 60 usually has a wiring pattern having two or more layers in the printed substrate, as illustrated in FIG. 3A and FIG. 3B. Therefore, there are many restrictions in the designing of the receiver coil 60. It may be difficult to change the shape of the receiver coil 60 to the sine wave shape, in a small size encoder having a micro sensor pattern. And so, the electromagnetic induction type encoder 100 of the embodiment has a structure for suppressing the occurrence of the higher harmonics wave even if the electromagnetic induction type encoder 100 is downsized.

Figure 4A:
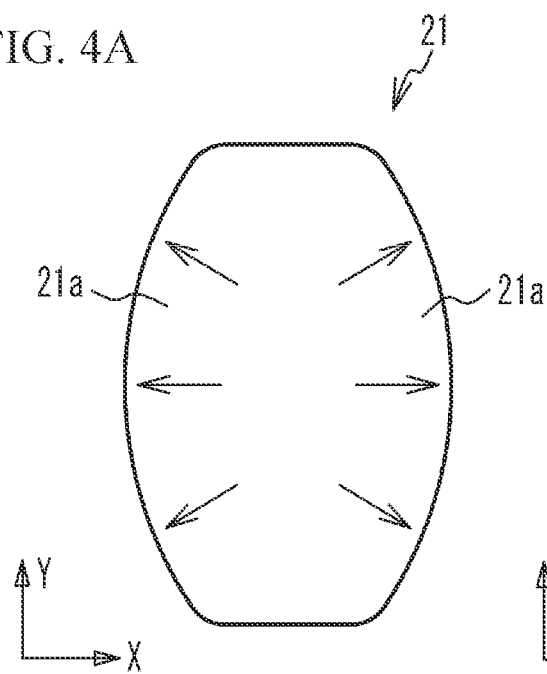
FIG. 4A to FIG. 4C illustrate details of a shape of a connection conductor.

FIG. 4A illustrates details of the shape of the connection conductor 21. As illustrated in FIG. 4A, the connection conductor 21 has projection portions 21a which projects toward both sides in the X-axis direction. In FIG. 4A, the projection portions 21a are formed in center positions of the connection conductor 21 in the Y-axis direction and project toward the both sides in the X-axis direction. At least a part of the projection portion 21a has an outer edge having a curvature which projects in the X-axis direction and is curved. And, as indicated with arrows, the projection portion 21a projects and is curved.

Figure 4B:
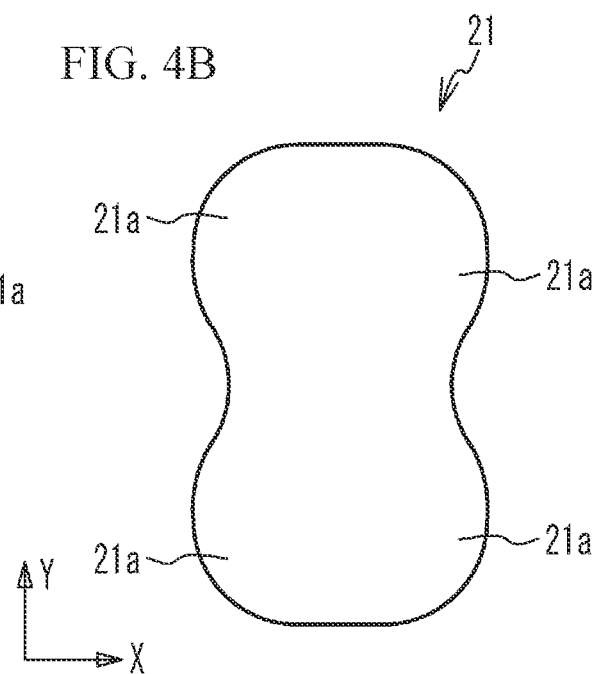

On the both sides in the measurement axis, the number of the projection portions 21a is not limited. For example, as illustrated in FIG. 4B, each of the connection conductors 21 has two or more projection portions 21a in the Y-axis direction.

Figure 4C:
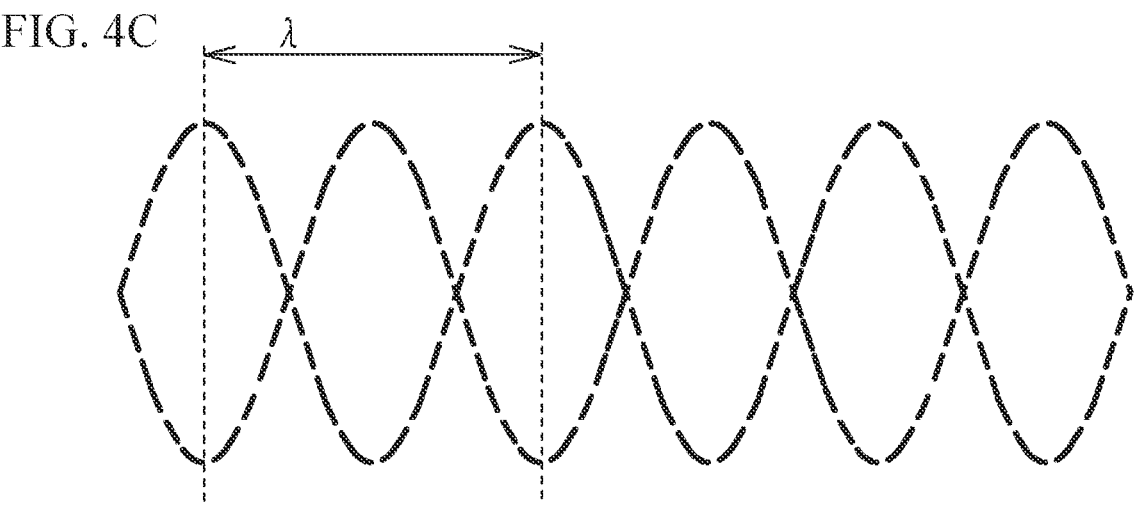
Figure 4C:
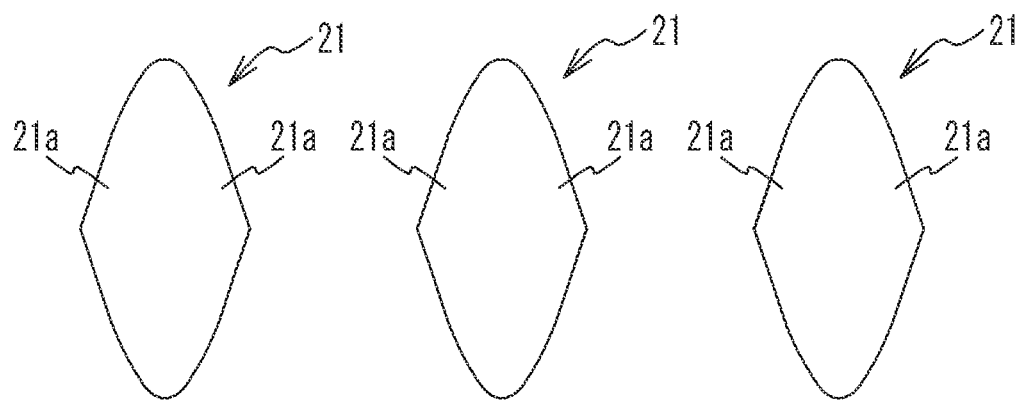

As illustrated in FIG. 4C, it is preferable that the shape of the outer edge of each of the connection conductors 21 coincides with a sine wave or is similar to the sine wave. In an upper figure of FIG. 4C, a sine wave having a period λ and another sine wave which is flipped upside down are illustrated. In lower figure of FIG. 4C, two or more of the connection conductors 21 arrayed with the period λ are illustrated. The connection conductors 21 have a shape in which periodical shapes of the upper figure are alternately extracted. As illustrated in the lower figure of FIG. 4C, the projection portion 21a of the connection conductor 21 may have a sharp portion which is not curved.

Figure 5A:
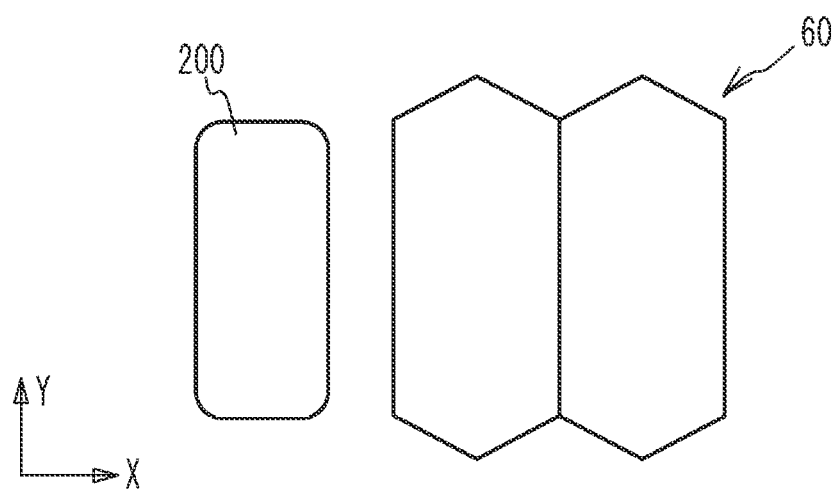
FIG. 5A to FIG. 5C illustrate a connection conductor of a comparative embodiment.
Figure 5B:
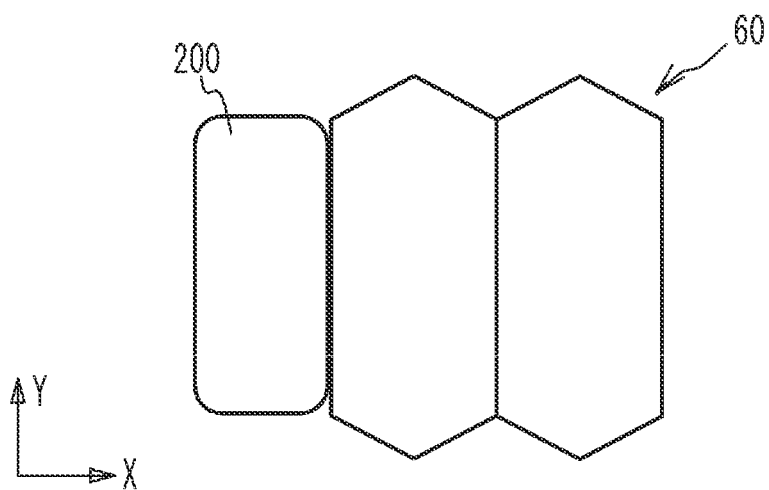
Figure 5C:
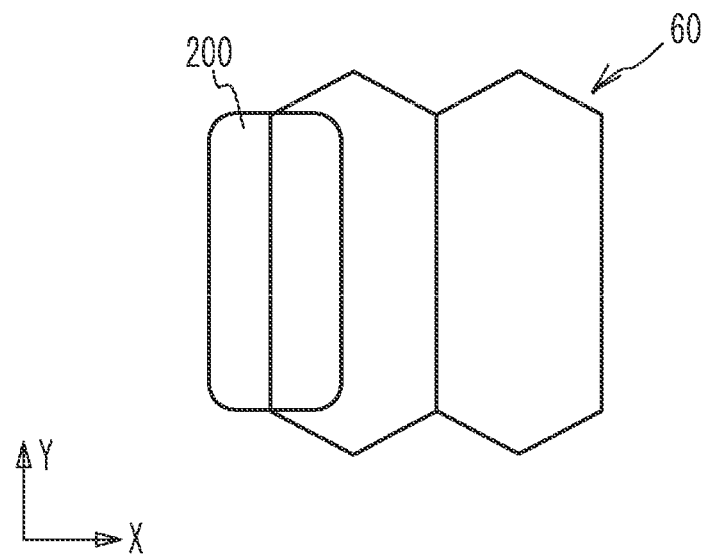

FIG. 5A to FIG. 5C illustrate a connection conductor 200 of a comparative embodiment. As illustrated in FIG. 5A, the connection conductor 200 has a rectangular shape having sides in parallel with the X-axis direction and sides in parallel with the Y-axis direction. FIG. 5B illustrates a case where the connection conductor 200 gets close to the receiver coil 60 in the X-axis direction. When the receiver coil 60 overlaps with the connection conductor 200 as illustrated in FIG. 5C, large signal intensity is achieved. In this manner, when the receiver coil 60 starts to overlap with the connection conductor 200, signal intensity is rapidly enlarged. On the other hand, when the overlapping of the receiver coil 60 with the connection conductor 200 finishes, the signal intensity is rapidly lowered. There is an error in the detected signal, when there is variation in the width of the connection conductor 200 in the X-axis direction because of manufacturing error or the like or there is variation in the position of the connection conductor 200 in the X-axis direction because of manufacturing error or the like. Therefore, a higher harmonics wave may occur.

Figure 6A:
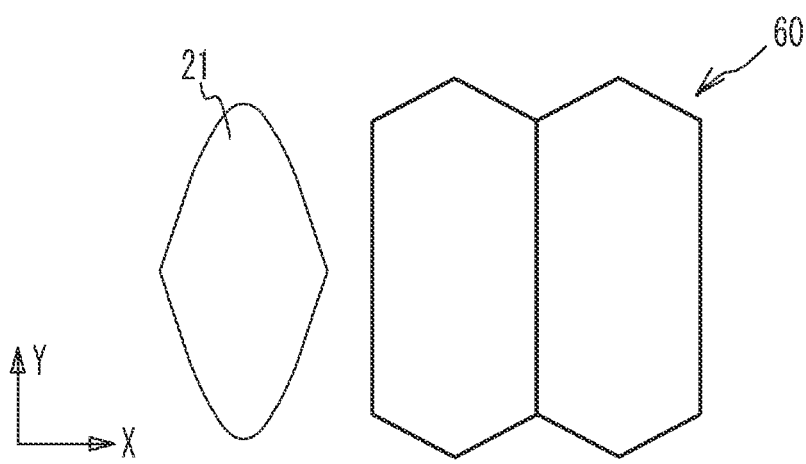
FIG. 6A to FIG. 6C illustrate a relationship between a connection conductor and a receiver coil.
Figure 6B:
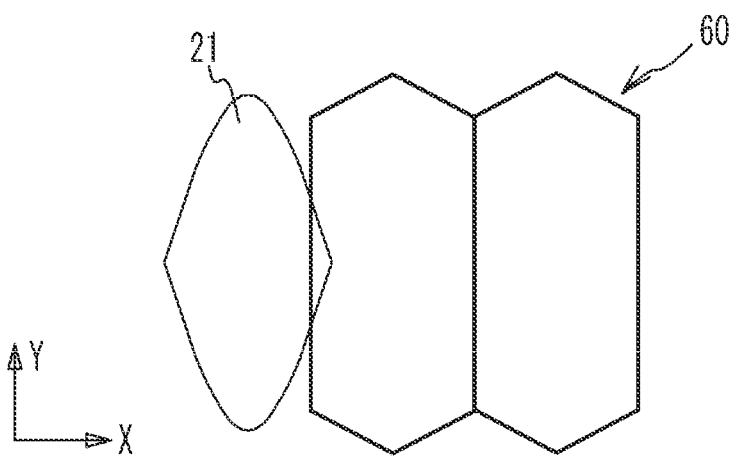
Figure 6C:
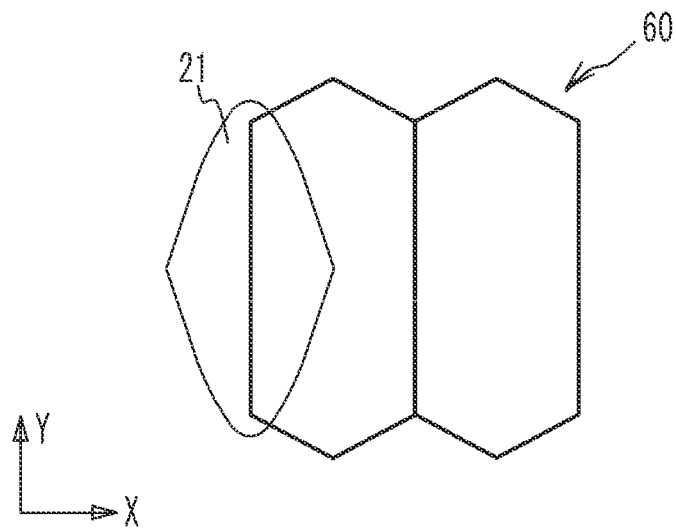

FIG. 6A illustrates a case where the receiver coil 60 does not overlap with the connection conductor 21. As illustrated in FIG. 6B and FIG. 6C, when the receiver coil 60 starts to overlap with the connection conductor 21, the signal intensity gradually increases. When the overlapping amount of the receiver coil 60 with the connection conductor 21 gradually decreases, the signal intensity gradually decreases. In the structure, the error in the detected signal is suppressed, even if there is variation in the width of the connection conductor 21 in the X-axis direction because of manufacturing error or even if there is variation in the position of the connection conductor 200 in the X-axis direction because of the manufacturing error. Moreover, the shape of the outer edge of the connection conductor 21 is similar to the shape of the sine wave signal detected by the receiver coil 60, because the tip of the projection portion 21a in the measurement axis is curved. Therefore, the occurrence of the higher harmonics wave is suppressed. When the shape of the outer edge of the connection conductor 21 is similar to the sine wave as illustrated in FIG. 4C, the occurrence of the higher harmonics wave is suppressed.

In the embodiment, the connection conductor 21 has the projection portions 21a which projects to the both sides in the X-axis direction. At least a part of the projection portion 21a has the curvature forming a curve which projects in the X-axis direction. It is therefore possible to suppress the higher harmonics wave. The connection conductor 21 does not have the double-layer structure of the receiver coil 60. Therefore, there is less restriction in designing of the connection conductor 21. The embodiment can be applied to a small size encoder having a micro sensor pattern. Accordingly, the electromagnetic induction type encoder 100 of the embodiment can suppress the occurrence of the higher harmonics wave, even if the electromagnetic induction type encoder 100 is downsized.

The present invention is not limited to the specifically disclosed embodiments and variations but may include other embodiments and variations without departing from the scope of the present invention.

What is claimed is:

1. An electromagnetic induction type encoder comprising:
   a scale having a plurality of conductors that are arrayed in a given interval along a measurement axis, wherein each of the plurality of conductors has projection portions, each of which projects toward each side of the measurement axis, wherein at least a part of each of the projection portions has a curve projecting in the measurement axis, wherein an end point of each of the projection portions angularly projects in the measurement axis direction, wherein the plurality of conductors are spaced from each other and are not connected to each other, in a region where the plurality of conductors are arrayed in the given interval; and
   a detection head that relatively moves in the measurement axis with respect to the scale,
   wherein the detection head has a transceiver coil configured to generate a first magnetic flux,
   wherein the plurality of conductors of the scale are configured to be electromagnetically coupled with the first magnetic flux generated by the transceiver coil and generate a second magnetic flux that fluctuates in a predetermined spatial period in the measurement axis direction,
   wherein the detection head has a receiver coil configured to be electromagnetically coupled with the second magnetic flux generated by the plurality of conductors and detect a phase of the second magnetic flux,
   wherein the receiver coil has periodical elements, each of which has a side at an end of the measurement axis, the side extending along a direction orthogonal to the measurement axis on a face of the detection head facing the scale, and
   wherein the receiver coil has a polygon shape having two sides that are vertical to the measurement axis.

2. The electromagnetic induction type encoder of claim 1, wherein the plurality of conductors are closed loop coils or board shape conductors without a hole.

3. The electromagnetic induction type encoder of claim 1, wherein an outer edge shape of the plurality of conductors has a sine wave shape.

4. The electromagnetic induction type encoder of claim 1, wherein the plurality of conductors are board shape conductors without a hole.

5. The electromagnetic induction type encoder of claim 1, wherein the plurality of conductors are electrically coupled with neither the transceiver coil nor the receiver coil.

6. The electromagnetic induction type encoder of claim 1, wherein the plurality of conductors are not overlapped each other.

7. The electromagnetic induction type encoder of claim 1, wherein the projection portions are formed in a center position of each of the plurality of conductors in a direction vertical to the measurement axis.

8. The electromagnetic induction type encoder of claim 1, wherein each of the plurality of conductors has two sides in a direction of the measurement axis, and each one of the two sides has two or more of the projection portions in a direction vertical to the measurement axis.

9. The electromagnetic induction type encoder of claim 1, wherein the projection portions are formed in a center position of each of the plurality of conductors in a first direction vertical to the measurement axis, and the plurality of conductors are not overlapped each other in a second direction vertical to the first direction and the measurement axis.

* * * * *